US012416610B2

(12) United States Patent
Watanabe

(10) Patent No.: US 12,416,610 B2
(45) Date of Patent: Sep. 16, 2025

(54) ANALYSIS ASSISTANCE DEVICE, METHOD, AND PROGRAM FOR AN ANALYSIS USED IN LIQUID CHROMATOGRAPHY

(71) Applicant: SHIMADZU CORPORATION, Kyoto (JP)

(72) Inventor: Satoru Watanabe, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/230,745

(22) Filed: Apr. 14, 2021

(65) Prior Publication Data

US 2021/0356446 A1 Nov. 18, 2021

(30) Foreign Application Priority Data

May 12, 2020 (JP) .................................. 2020-084060

(51) Int. Cl.
*G01N 30/86* (2006.01)
*G01N 30/02* (2006.01)

(52) U.S. Cl.
CPC ..... *G01N 30/8675* (2013.01); *G01N 30/8637* (2013.01); *G01N 2030/027* (2013.01)

(58) Field of Classification Search
CPC ........... G01N 30/8675; G01N 30/8637; G01N 2030/027; G01N 30/8634
See application file for complete search history.

(56) References Cited

U.S. PATENT DOCUMENTS

| | | |
|---|---|---|
| 5,209,853 A | 5/1993 | Lynch et al. |
| 8,515,685 B2 | 8/2013 | Denny et al. |
| 11,244,818 B2 * | 2/2022 | Abramovitch ....... G06K 9/0053 |

(Continued)

FOREIGN PATENT DOCUMENTS

| | | | |
|---|---|---|---|
| CA | 2646508 A1 | | 9/2007 |
| CN | 101695480 A | * | 4/2010 |

(Continued)

OTHER PUBLICATIONS

Wang "Qualitative and Quantitative chromatography", 2000, pp. 1-11 (Year: 2000).*

(Continued)

*Primary Examiner* — Eyob Hagos
(74) *Attorney, Agent, or Firm* — Renner, Otto, Boisselle & Sklar, LLP

(57) ABSTRACT

An analysis assistance device includes a chromatogram generator that generates a chromatogram using measurement data obtained from an analysis device, an area calculator that calculates an area percentage of each peak included in the chromatogram, a determiner that determines a separation state of each peak included in the chromatogram, and an analysis assistance information outputter that outputs analysis assistance information to a display. The analysis assistance information outputter includes a chromatogram outputter that outputs the chromatogram generated by the chromatogram generator to the display and also outputs information to display one peak in an identified manner when the one peak has an area percentage of not less than a predetermined threshold value, and the determiner determines that the one peak is an unseparated peak.

6 Claims, 10 Drawing Sheets

(56) References Cited

U.S. PATENT DOCUMENTS

| | | |
|---|---|---|
| 2010/0013757 A1 | 1/2010 | Ogikubo |
| 2013/0123126 A1 | 5/2013 | Collins et al. |
| 2013/0275439 A1 | 10/2013 | Minvielle |
| 2014/0156612 A1 | 6/2014 | Bondarenko |
| 2014/0236497 A1 | 8/2014 | Escher et al. |
| 2014/0257712 A1 | 9/2014 | Mito |
| 2015/0055844 A1 | 2/2015 | Molin et al. |
| 2016/0180555 A1* | 6/2016 | Matsuo ............... G06F 3/0482 345/440 |
| 2017/0136389 A1* | 5/2017 | Jackson ............... B01D 15/40 |
| 2017/0322190 A1 | 11/2017 | Nyholm et al. |
| 2019/0086374 A1* | 3/2019 | Ito ..................... G01N 30/8651 |
| 2019/0092835 A1* | 3/2019 | Leister ................ A61P 37/02 |
| 2019/0369069 A1* | 12/2019 | Ota ..................... G06F 3/14 |
| 2020/0064193 A1 | 2/2020 | Chono et al. |
| 2020/0110064 A1* | 4/2020 | Sugimoto ........ G01N 30/8651 |
| 2021/0009964 A1* | 1/2021 | Khatwani ........... B01D 15/424 |
| 2021/0048414 A1* | 2/2021 | Gardinier .......... A61K 47/6923 |
| 2021/0327564 A1 | 10/2021 | Ferreira et al. |
| 2021/0405002 A1 | 12/2021 | Noda |

FOREIGN PATENT DOCUMENTS

| | | | | |
|---|---|---|---|---|
| CN | 107110835 A | * | 8/2017 | ............ G01N 30/26 |
| CN | 111413425 B | * | 7/2022 | ............ G01N 30/34 |
| EP | 2270491 A | | 1/2011 | |
| JP | 02-300660 A | | 12/1990 | |
| JP | 05-322869 A | | 12/1993 | |
| JP | H06-324029 A | | 11/1994 | |
| JP | H07-151743 A | | 6/1995 | |
| JP | H09-318613 A | | 12/1997 | |
| JP | 2004-053283 A | | 2/2004 | |
| JP | 2012-163476 A | | 8/2012 | |
| JP | 2014-098672 A | | 5/2014 | |
| JP | 2017-534060 A | | 11/2017 | |
| JP | 2020183931 A | * | 11/2020 | ............ B01D 59/44 |
| WO | 2013/035639 A1 | | 3/2013 | |
| WO | WO-2020020152 A1 | * | 1/2020 | |

OTHER PUBLICATIONS

Development of an algorithm for peak detection in comprehensive two-dimensional chromatography (Year: 2007).*

Office Action for commonly owned-copending U.S. Appl. No. 17/230,698 dated Aug. 9, 2022.

Commonly Owned-Copending U.S. Appl. No. 17/230,698 (SS-US0109A), filed Apr. 14, 2021.

Commonly Owned-Copending U.S. Appl. No. 17/230,723 (SS-US0110A), filed Apr. 14, 2021.

Office Action for corresponding U.S. Appl. No. 17/230,698 dated Mar. 3, 2023.

Office Action in Chinese patent application 202110380504.0, and English machine translation thereof, dated Nov. 24, 2022.

Publication "Study to Determine Sudan Red Component in Hot Pepper Products by High Performance Liquid Chromatography" by Kanan Chemicals; vol. 27, No. 11; pp. 33-37, and English machine translation thereof, dated Nov. 30, 2010.

Office Action for related U.S. Appl. No. 17/230,723 dated Mar. 10, 2023.

Office Action in corresponding Chinese Patent Application No. 202110380504.0 dated Sep. 7, 2023, with English machine translation.

Notice of Reasons for Refusal in corresponding JP Patent Application No. 2020-084060 dated Jul. 11, 2023, with English machine translation.

Office Action in commonly owned co-pending U.S. Appl. No. 17/230,723 dated Oct. 12, 2023.

Gerdtsson, Erik, and et al. "Multiplex protein detection on circulating tumor cells from liquid biopsies using imaging mass cytometry"; Convergent Science Physical Oncology 4, No. 1 (2018): 015002 (Year: 2018).

Wanner, Adrian A., and et al. "Dense EM-based reconstruction of the interglomerular projectome in the zebrafish olfactory bulb." Nature neuroscience 19, No. 6 (2016): 816-825 (Year: 2016).

Office Action in related Chinese Patent Application No. 202110439368.8 dated Sep. 1, 2023, with English machine translation Office Action dated Jun. 16, 2023 for corresponding Chinese Application No. 202110380504.0 (English machine translation).

Notice of Reasons for Refusal dated Jul. 4, 2023 in the corresponding Japanese Patent Application (2020-077306) (English machine translation).

Notice of Allowance dated Jul. 6, 2023 for corresponding U.S. Appl. No. 17/230,698.

Office Action in related Chinese Patent Application No. 2021104393686.8 dated Sep. 1, 2023, with English machine translation.

Office Action in corresponding Chinese Patent Application No. 202110493186.9 dated Jul. 27, 2023, with English machine translation.

Office Action in related Chinese Patent Application No. 202110380504.0 dated Nov. 23, 2023, with English machine translation.

Office Action in corresponding Chinese Patent Application No. 202110439368.8 dated Apr. 26, 2024, with English machine translation.

Office Action issued in corresponding U.S. Appl. No. 17/230,723 dated Oct. 21, 2024.

Beens, et al.; "Quantitative Aspects of Comprehensive Two-Dimensional Gas Chromatography (GC × GC)"; Journal of High Resolution Chromatography 21, No. 1 (1998): 47-54.

Notice of Allowance issued in corresponding U.S. Appl. No. 17/230,723 dated Apr. 24, 2025.

Decision on Rejection in corresponding Chinese Patent Application No. 202110380504.0 dated Apr. 13, 2024, with English machine translation.

Ma Liping et al.; "Applied regression analysis", pp. 2-3, Capital University of Economics and Business Press; published May 21, 2019; with English machine translation.

Ordnance Industry Science and Technology Dictionary Editorial Committee; "Ordnance Industry Science and Technology Dictionary (Part 1)", pp. 172, National Defense Industry Press; published Feb. 28, 2998; with English machine translation.

Decision on Rejection in corresponding Chinese Patent Application No. 202110493186.9 dated Apr. 9, 2024, with English machine translation.

Wang Zhengfan; "Chromatographic Qualification and Quantification"; Chemical Industry Press; pp. 267-269; Mar. 31, 2000, with English machine translation thereof.

* cited by examiner

ANALYSIS ASSISTANCE DEVICE, METHOD, AND PROGRAM FOR AN ANALYSIS USED IN LIQUID CHROMATOGRAPHY

BACKGROUND

Technical Field

The present invention relates to an analysis assistance device, an analysis assistance method, and a non-transitory computer readable medium storing an analysis assistance program.

Description of Related Art

An analysis device that analyzes components of a sample is provided. Data measured in the analysis device includes a mix of data of impurities that are present in the sample. As such, a chromatogram created based on the measured data also includes micro peaks of the impurities other than peaks of the sample. As for impurities, verification based on guidelines is required in general, and thus takes time and labor. Therefore, the verification of the impurities is a cause of an increased cost for an analysis step and further a development step.

WO 2013/035639 A1 discloses a chromatograph data processing device. The chromatograph data processing device of WO 2013/035639 A1 can determine whether any impurity is contained at peaks in a chromatogram.

Also, there is a technique that can estimate distribution of a measurement quality index by performing a regression analysis between an analysis condition and the measurement quality index. Then, the technique can assist a method scouting work by presenting to a user a range in which the measurement quality index exceeds a threshold value in the distribution of the measurement quality index as a design space.

SUMMARY

The data processing device disclosed in WO 2013/035639 A1 can help the user determine whether the peaks included in the chromatogram are derived from components or from impurities. Furthermore, if various information as to the peaks included in the chromatogram can be provided, it is beneficial for the user who uses an analysis device.

An object of the present invention is to provide a user with useful information as to peaks included in a chromatogram in an analysis device.

An analysis assistance device according to one aspect of the present invention includes a chromatogram generator that generates a chromatogram using measurement data obtained from an analysis device, an area calculator that calculates an area percentage of each peak included in the chromatogram, a determiner that determines a separation state of each peak included in the chromatogram, and an analysis assistance information outputter that outputs analysis assistance information to a display. The analysis assistance information outputter includes a chromatogram outputter that outputs the chromatogram generated by the chromatogram generator to the display, and also outputs information to display one peak in an identified manner when an area percentage of the one peak is not less than a predetermined threshold value, and the determiner determines that the one peak is an unseparated peak.

Other features, elements, characteristics, and advantages of the present disclosure will become more apparent from the following description of preferred embodiments of the present disclosure with reference to the attached drawings.

DETAILED DESCRIPTION

Configurations of an analysis assistance device, an analysis assistance method, and an analysis assistance program according to an embodiment of the present invention will be described below with reference to the attached drawing.

(1) Overall Configuration of Analysis System

Figure 1:
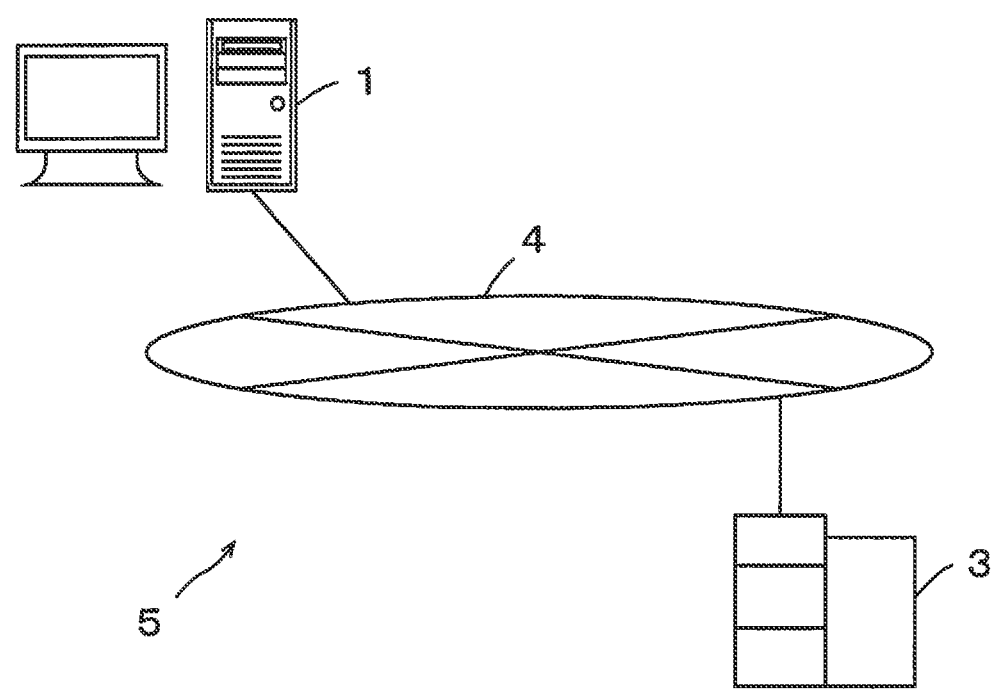
FIG. 1 is an overall view of an analysis system according to the present embodiment.

FIG. 1 is an overall diagram of an analysis system 5 according to the embodiment of the present invention. The analysis system 5 includes a computer 1 and a liquid chromatograph 3. The computer 1 and the liquid chromatograph 3 are connected to each other via a network 4. The network 4 is, for example, a LAN (Local Area Network).

The computer 1 includes a function of setting analysis conditions in the liquid chromatograph 3, a function of acquiring measurement results in the liquid chromatograph 3 and analyzing the acquired measurement results, etc. A program for controlling the liquid chromatograph 3 is installed in the computer 1.

The liquid chromatograph 3 includes a pump unit, an autosampler unit, a column oven unit, a detector unit, etc. The liquid chromatograph 3 includes also a system controller. The system controller controls the liquid chromatograph 3 in accordance with a control instruction received via the network 4 from the computer 1. The system controller transmits data of the measurement results of the liquid chromatograph 3 to the computer 1 via the network 4.

(2) Configuration of Computer (Analysis Assistance Device)

Figure 2:
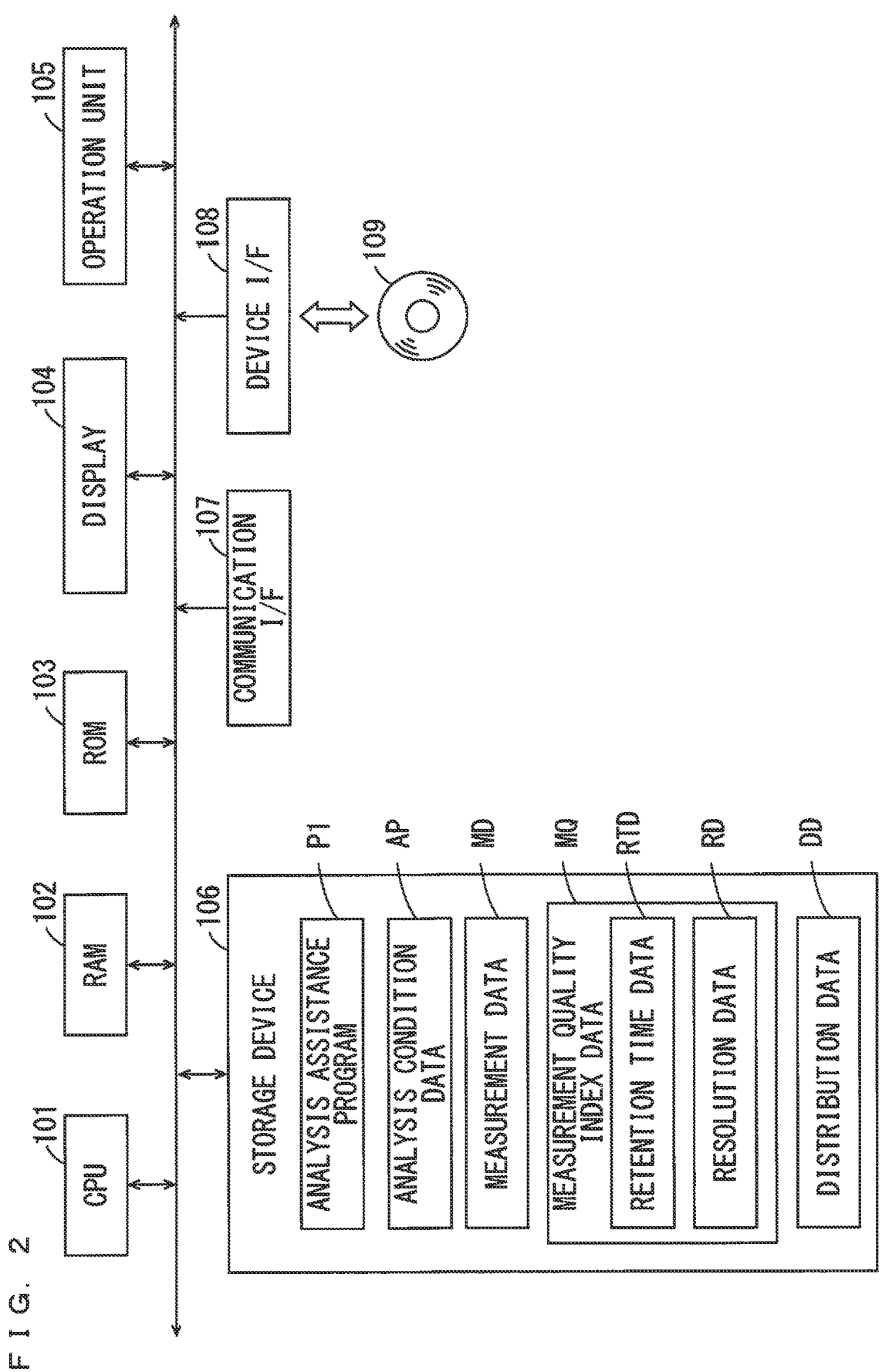
FIG. 2 is a configuration diagram of a computer according to the present embodiment.

FIG. 2 is a configuration diagram of the computer 1. A personal computer is utilized as the computer 1 in the present embodiment. The computer 1 includes a CPU (Central Processing Unit) 101, a RAM (Random Access Memory) 102, a ROM (Read Only Memory) 103, a display 104, an operation unit 105, a storage device 106, a communication interface 107, and a device interface 108.

The CPU 101 performs control of the computer 1. The RAM 102 is used as a work area when the CPU 101 executes a program. The ROM 103 stores a control program, etc. The display 104 is, for example, a liquid crystal display. The operation unit 105 is a device that accepts a user's operation and includes a keyboard, a mouse, etc. The display 104 may be constituted by a touch panel display and may include a function as the operation unit 105. The storage device 106 is a device that stores various programs and data. The storage device 106 is, for example, a hard disk. The communication interface 107 is an interface that communicates with another computer and another device. The communication interface 107 is connected to the network 4. The device interface 108 is an interface that accesses various external devices. The CPU 101 can access a storage medium 109 through the external devices connected to the device interface 108.

The storage device 106 stores an analysis assistance program P1, analysis condition data AP, measurement data MD, measurement quality index data MQ, and distribution data DD. The analysis assistance program P1 is a program for controlling the liquid chromatograph 3. The analysis assistance program P1 includes a function of setting an analysis condition for the liquid chromatograph 3, a function of acquiring a measurement result from the liquid chromatograph 3 and analyzing the measurement result such as generating a chromatogram, etc. The analysis condition data AP is data that describes the analysis condition to be set in the liquid chromatograph 3 and includes a plurality of analysis parameters. The measurement data MD is data of the measurement result acquired from the liquid chromatograph 3. The measurement quality index data MQ is data for evaluating quality of the measurement result acquired from the liquid chromatograph 3. The measurement quality index data MQ includes retention time data RTD and resolution data RD. The distribution data DD is data indicating distribution of measurement quality index data MQ estimated based on analysis condition data AP actually set in the liquid chromatograph 3 and measurement data MD actually measured in the liquid chromatograph 3. The distribution data DD indicates a response surface of the measurement quality index data MQ. The distribution and the response surface of the measurement quality index data MQ will be described in detail later.

Figure 3:
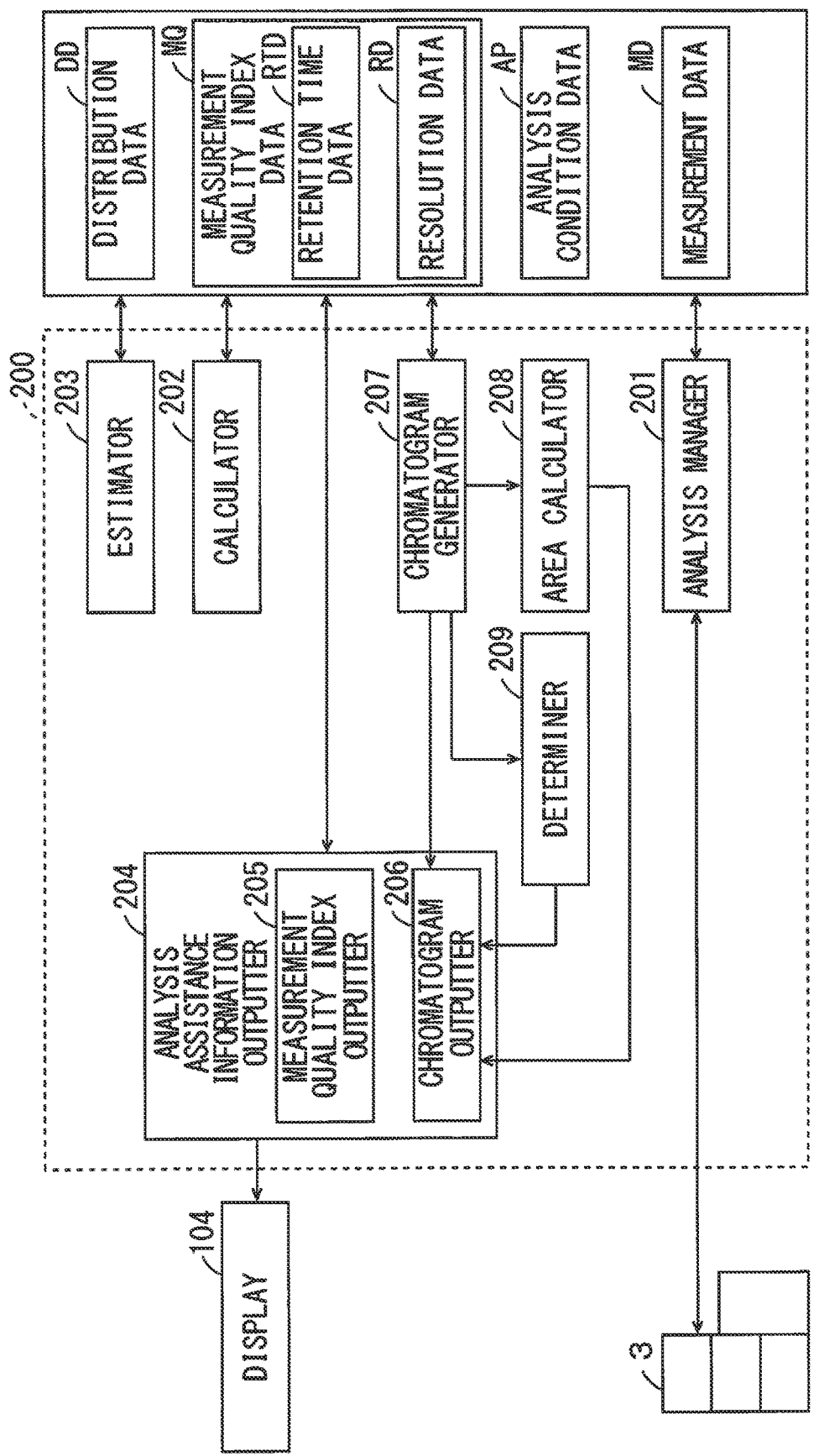
FIG. 3 is a functional block diagram of the computer according to the present embodiment.

FIG. 3 is a functional block diagram of the computer 1. A controller 200 is a functional unit that is implemented by the CPU 101 using the RAM 102 as a work area to execute the analysis assistance program P1. The controller 200 includes an analysis manager 201, a calculator 202, an estimator 203, an analysis assistance information outputter 204, a chromatogram generator 207, an area calculator 208, and a determiner 209.

The analysis manager 201 controls the liquid chromatograph 3. The analysis manager 201 instructs the liquid chromatograph 3 to perform analysis processing in response to the user's instruction to set analysis condition data AP and start the analysis processing. The analysis manager 201 also acquires measurement data MD from the liquid chromatograph 3.

The calculator 202 calculates measurement quality index data MQ based on measurement data MD indicating a measurement result in the liquid chromatograph 3. The calculator 202 calculates retention time data RTD and resolution data RD as the measurement quality index data MQ.

The estimator 203 estimates distribution data DD indicating distribution of measurement quality index data MQ based on analysis condition data AP used for actual measurement and measurement quality index data MQ actually calculated based on that analysis condition data AP. That is, the distribution data DD includes an estimated value of the measurement quality index data MQ for analysis condition data AP that is not actually used for measurement. The estimator 203 performs a regression analysis for estimating the distribution data DD.

The analysis assistance information outputter 204 performs output of information for analysis assistance to the display 104 using the chromatogram generated by the chromatogram generator 207, the measurement quality index data MQ estimated in the estimator 203, the distribution data DD, etc. The analysis assistance information outputter 204 includes a measurement quality index outputter 205 and a chromatogram outputter 206.

The chromatogram generator 207 generates a chromatogram based on the measurement data MD. The area calculator 208 calculates an area percentage of each peak included in the chromatogram. The determiner 209 determines a separation state of each peak included in the chromatogram based on the resolution data RD.

(3) Measurement Quality Index and Design Space

Figure 4:
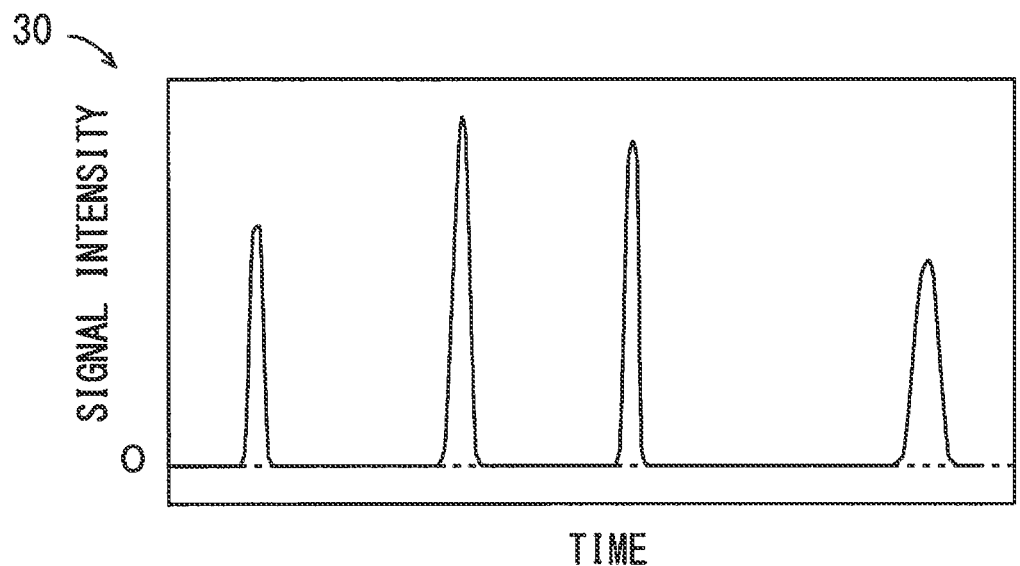
FIG. 4 is a diagram showing a chromatogram obtained in a liquid chromatograph.

A measurement quality index and a design space will be described below with reference to FIGS. 4 to 6. FIG. 4 is a diagram showing a chromatogram 30 obtained in the liquid chromatograph 3. In a separation column included in the liquid chromatograph 3, components contained in a sample are separated. The separated components are detected by a detector included in the liquid chromatograph 3. The detector detects an absorption spectrum, a refractive index, light scattering or the like of each component separated in the separation column. The chromatogram 30 shown in FIG. 4 indicates signal intensity of the absorption spectrum or the like of each component detected by the detector of the liquid chromatograph 3.

Figure 5:
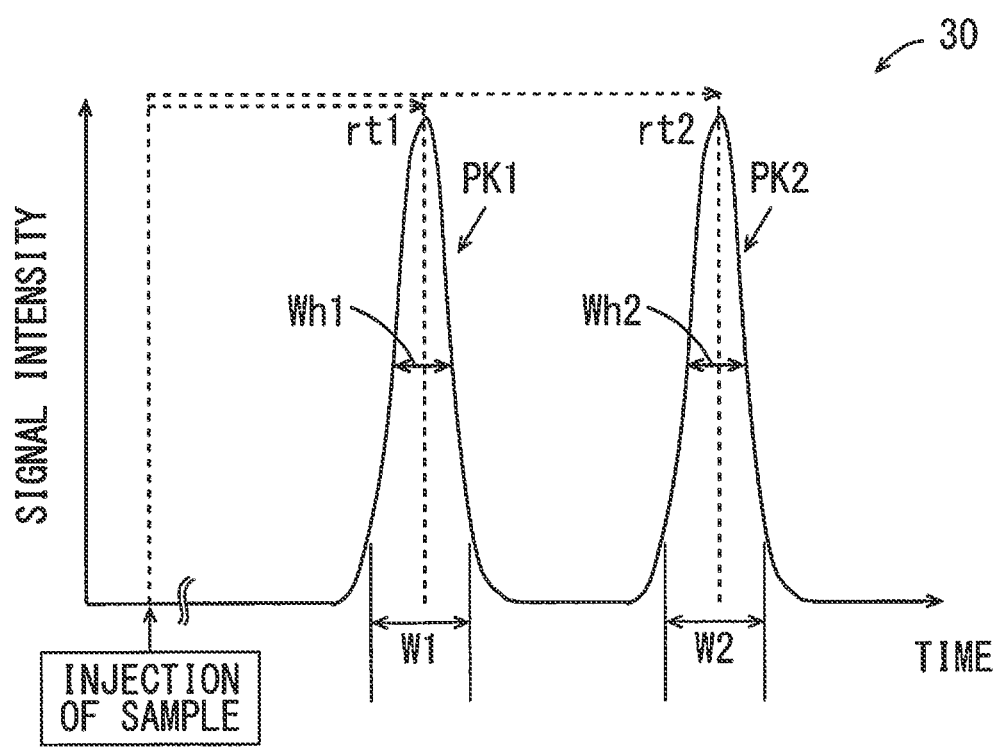
FIG. 5 is a diagram showing peaks in the chromatogram.

FIG. 5 is a diagram showing two peaks PK1, PK2 in the chromatogram 30. Retention times of the peaks PK1, PK2 are rt1, rt2, respectively. Peak widths of the peaks PK1, PK2 are W1, W2, respectively. Half widths (full widths at half maximum) of the peaks PK1, PK2 are Wh1, Wh2, respectively. Resolution R of the peaks PK1, PK2 is expressed by the flowing equation (1) or (2), for example.

$$R = 2 \times (rt2 - rt1)/(W1 + W2) \tag{1}$$

$$R = 1.18 \times \{(rt2 - rt1)/(Wh2)\} \tag{2}$$

The above equations mean that adjacent peaks are separated at a farther distance from each other as the value of the resolution R becomes larger. When the resolution R is not less than 1.5 or not less than 2.0, the adjacent peaks are determined to be completely separated.

When the resolution R exceeds a predetermined threshold value (e.g. 2.0), it is considered that a measurement result in the liquid chromatograph 3 is valid. That is, the resolution R is one of measurement quality indexes in the liquid chromatograph 3. A plurality of peaks corresponding to a plurality of components appear in the chromatogram 30. A minimum resolution R among a plurality of resolutions R calculated from these plurality of peaks can be defined as a measurement quality index. Alternatively, the retention time rt1, rt2 is also one of the measurement quality indexes in the liquid chromatograph 3.

A plurality of measurement data MD can be obtained by actually providing the liquid chromatograph 3 with a plurality of analysis condition data AP. Resolution data RD corresponding to each analysis condition data AP can be calculated from the actually measured measurement data MD. Then, distribution of the resolution data RD can be obtained by a regression analysis from the plurality of analysis condition data AP and the plurality of resolution data RD obtained from the plurality of analysis condition data AP. That is, distribution of measurement quality index data MQ can be obtained from the plurality of analysis condition data AP and the plurality of resolution data RD.

More specifically, a regression equation between the actually used plurality of analysis condition data AP and the plurality of resolution data RD calculated from the actually measured measurement data MD is acquired. Then, by applying the regression equation to other analysis condition data AP that are not actually used, resolution data RD corresponding to these other analysis condition data AP are estimated. Thus, distribution of the resolution data RD as the measurement quality index is obtained. That is, the regression equation indicates the distribution of the resolution data RD as the measurement quality index. Alternatively, distribution of the retention time data RTD may be estimated by the regression analysis, and the resolution data RD may be calculated from the estimated retention time data RTD. Bayes estimation can be used in the regression analysis.

Figure 6:
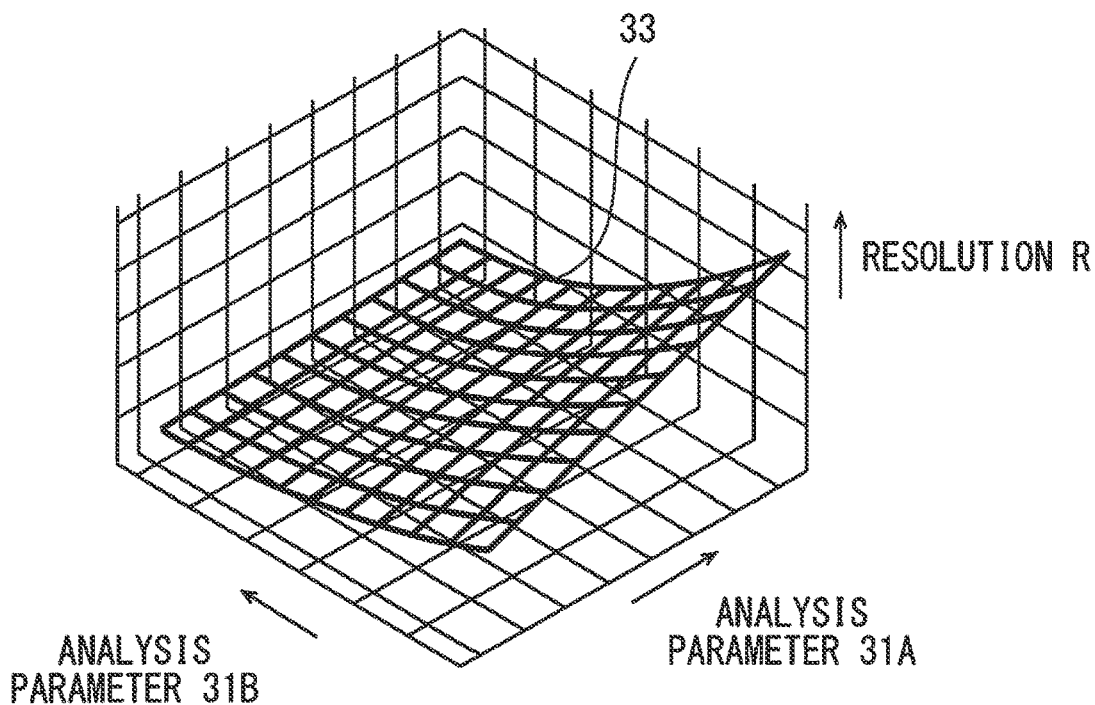
FIG. 6 is a diagram showing a response surface showing distribution of resolution.

FIG. 6 is a diagram showing one example of a response surface 33 which is the distribution of the resolution data RD. That is, FIG. 6 is a diagram showing the distribution of the resolution data RD as the measurement quality index. FIG. 6 depicts a response surface 33 indicating a change in resolution R relative to two types of analysis parameters 31A, 31B as the analysis condition. That is, if a combination of the analysis parameters 31A, 31B as the analysis condition is determined, resolution R corresponding to the determined combination is evaluated from the response surface 33.

Figure 7:
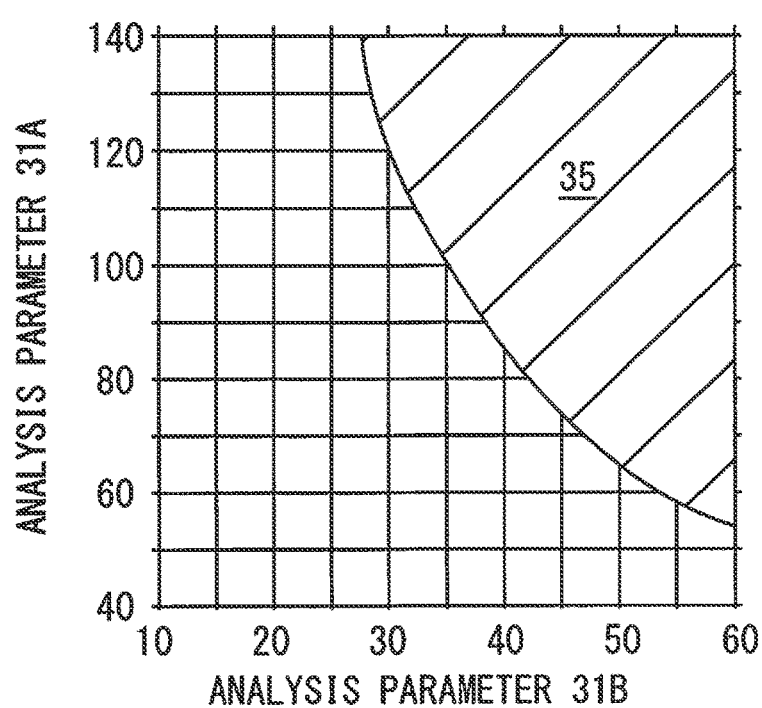
FIG. 7 is a diagram showing a design space relative to the distribution of resolution.

FIG. 7 is a diagram showing a design space relative to distribution of resolution R. In the response surface 33 shown in FIG. 6, a design space 35 being an allowable range of the resolution R is acquired by setting a threshold value of the resolution R as the measurement quality index. FIG. 7 depicts a region where the resolution R is not less than a threshold value (e.g., 2.0) as the design space 35 in the response surface 33 shown in FIG. 6. In FIG. 7, a hatched region is the design space 35. In the region of the design space 35, even if the analysis parameters 31A, 31B are changed, it is shown that the resolution R as the measurement quality index falls within the allowable range.

(4) Analysis Assistance Method

Figure 8:
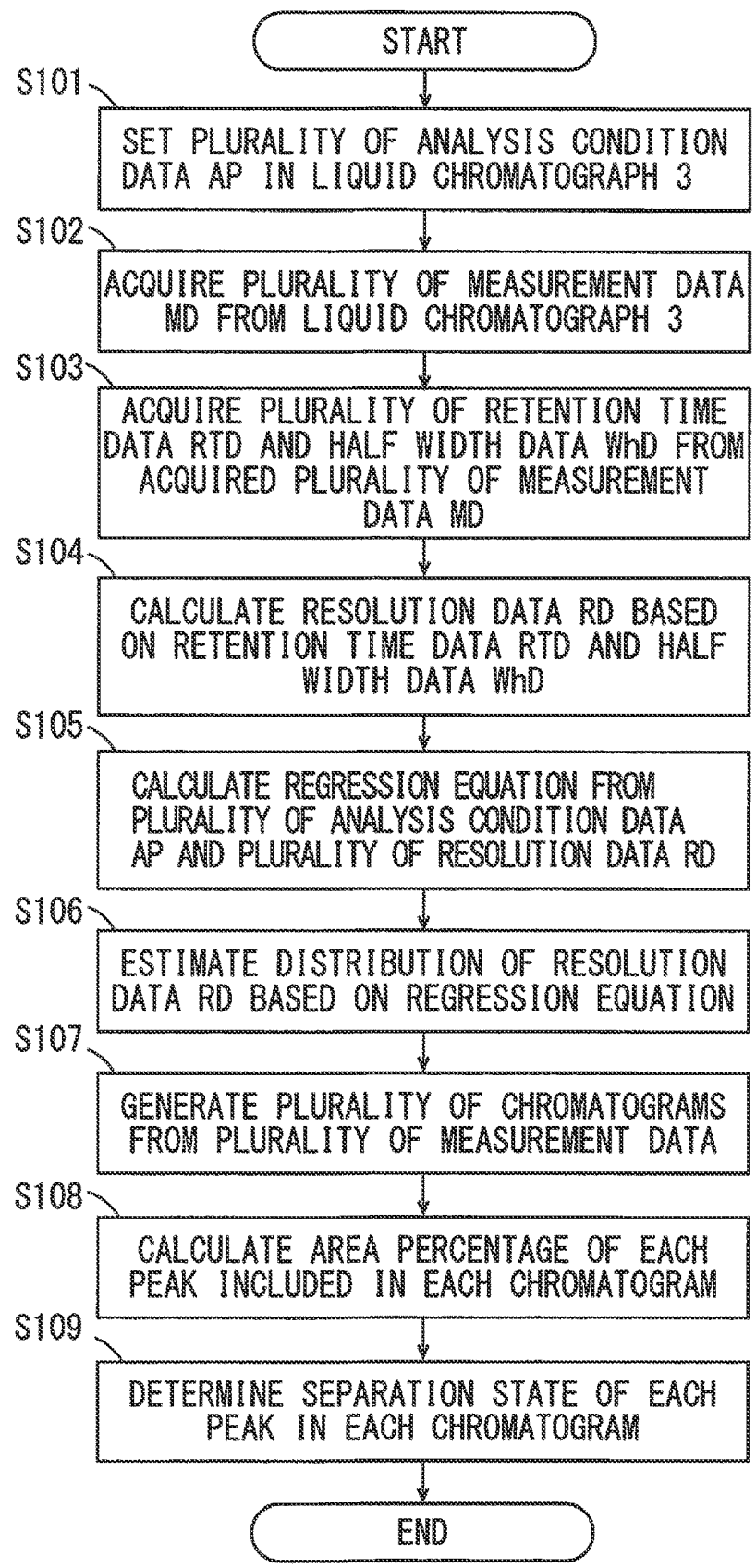
FIG. 8 is a flowchart showing an analysis assistance method according to the present embodiment.
Figure 9:
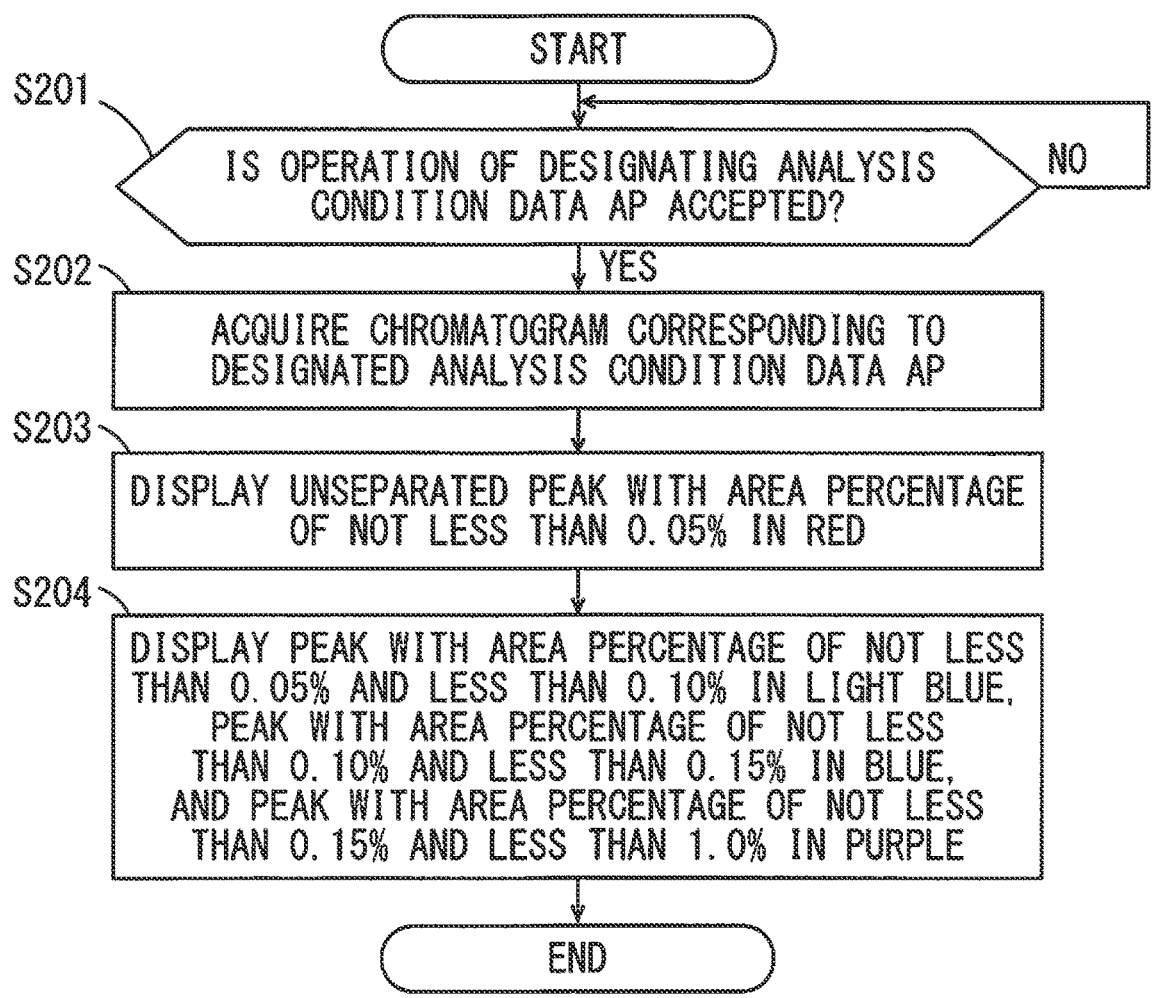
FIG. 9 is a flowchart showing an analysis assistance method according to the present embodiment.

An analysis assistance method executed in the computer 1 (analysis assistance device) according to the present embodiment will be described below. FIGS. 8 and 9 are flowcharts showing the analysis assistance method according to the present embodiment. Before processing shown in FIG. 8 is started, a user operates the operation unit 105 in advance to set a plurality of analysis conditions. More specifically, the user sets combinations of set values of analysis parameters such as a solvent concentration, a solvent mixing ratio, a gradient initial value, a gradient condition, a column temperature as the analysis conditions. The user sets a plurality of sets of combinations of these analysis parameters. The user sets, as the analysis conditions, for example, combinations of the analysis parameters in which the solvent concentration is gradually changed, or combinations of the analysis parameters in which the column temperature is gradually changed. In response to such a setting operation by the user, the analysis manager 201 stores a plurality of analysis condition data AP in the storage device 106.

Then, in step S101 shown in FIG. 8, the analysis manager 201 sets the plurality of analysis condition data AP in the liquid chromatograph 3. More specifically, the analysis manager 201 sets the plurality of analysis condition data AP for a system controller of the liquid chromatograph 3. In response to this, analysis processing is executed plural times on a same sample based on the set plurality of analysis condition data AP. A plurality of measurement data MD corresponding to the plurality of analysis condition data AP are acquired in the liquid chromatograph 3.

Next, in step S102, the analysis manager 201 acquires the plurality of measurement data MD from the liquid chromatograph 3. The analysis manager 201 stores the acquired plurality of measurement data MD in the storage device 106.

Then, in step S103, the calculator 202 acquires the plurality of measurement data MD stored in the storage device 106 in step S102, and acquires a plurality of retention time data RTD and a plurality of half width data WhD from the acquired plurality of measurement data MD. Each measurement data MD includes a plurality of peaks. Thus, the plurality of retention time data RTD and the plurality of half width data WhD corresponding to the plurality of peaks are acquired from each measurement data MD.

Then, in step S104, the calculator 202 calculates a plurality of resolution data RD using the plurality of retention time data RTD and the plurality of half width data WhD acquired in step 103. The calculator 202 calculates the resolution data RD based on the retention time data RTD and the half width data WhD by utilizing the above-mentioned equation (2). Note that while the half width data WhD is acquired and the resolution data RD is calculated by utilizing the equation (2) in the present embodiment, a peak width may be acquired and the resolution data RD may be calculated by utilizing the equation (1).

Then, in step S105, the estimator 203 performs a regression analysis based on the plurality of analysis condition data AP and the plurality of resolution data RD. Thus, the estimator 203 calculates a regression equation between the analysis conditions and the resolution. Subsequently, in step S106, the estimator 203 estimates distribution of the resolution data RD based on the regression equation. In the present embodiment, Bayes estimation is used when the regression analysis is performed. As another method, a least-square method can also be used as the regression analysis.

Since the aforementioned steps S101 to S106 performed by the analysis assistance program P1 are executed by the computer 1, resolution data RD is estimated also as to analysis conditions other than the actually executed analysis conditions. Thus, the estimator 203 creates distribution data DD using the resolution data RD as the measurement quality index. The estimator 203 stores the distribution data DD into the storage device 106.

Next, in step S107, the chromatogram generator 207 generates a chromatogram based on measurement data MD. The chromatogram generator 207 generates a plurality of chromatograms corresponding to a plurality of measurement data MD.

Subsequently, in step S108, the area calculator 208 calculates an area percentage of each peak included in the chromatograms. The area calculator 208 calculates the area percentage of each peak for each of the plurality of chromatograms. The area percentage of each peak is a ratio of the area of each peak to the sum of the areas of all the peaks in each chromatogram. The area of each peak is an area of a portion excluding a portion below a baseline.

Then, in step S109, the determiner 209 determines a separation state of each peak in each chromatogram based on the resolution data RD. When resolution R of each peak is less than a predetermined threshold value, the determiner 209 determines that those peaks are unseparated (coupled). For example, when the resolution R is not more than 1.0, the determiner 209 determines that the peaks are unseparated. Note that, as described above, when the resolution R is not less than 2.0, for example, the determiner 209 determines that each peak is completely separated.

Figure 10:
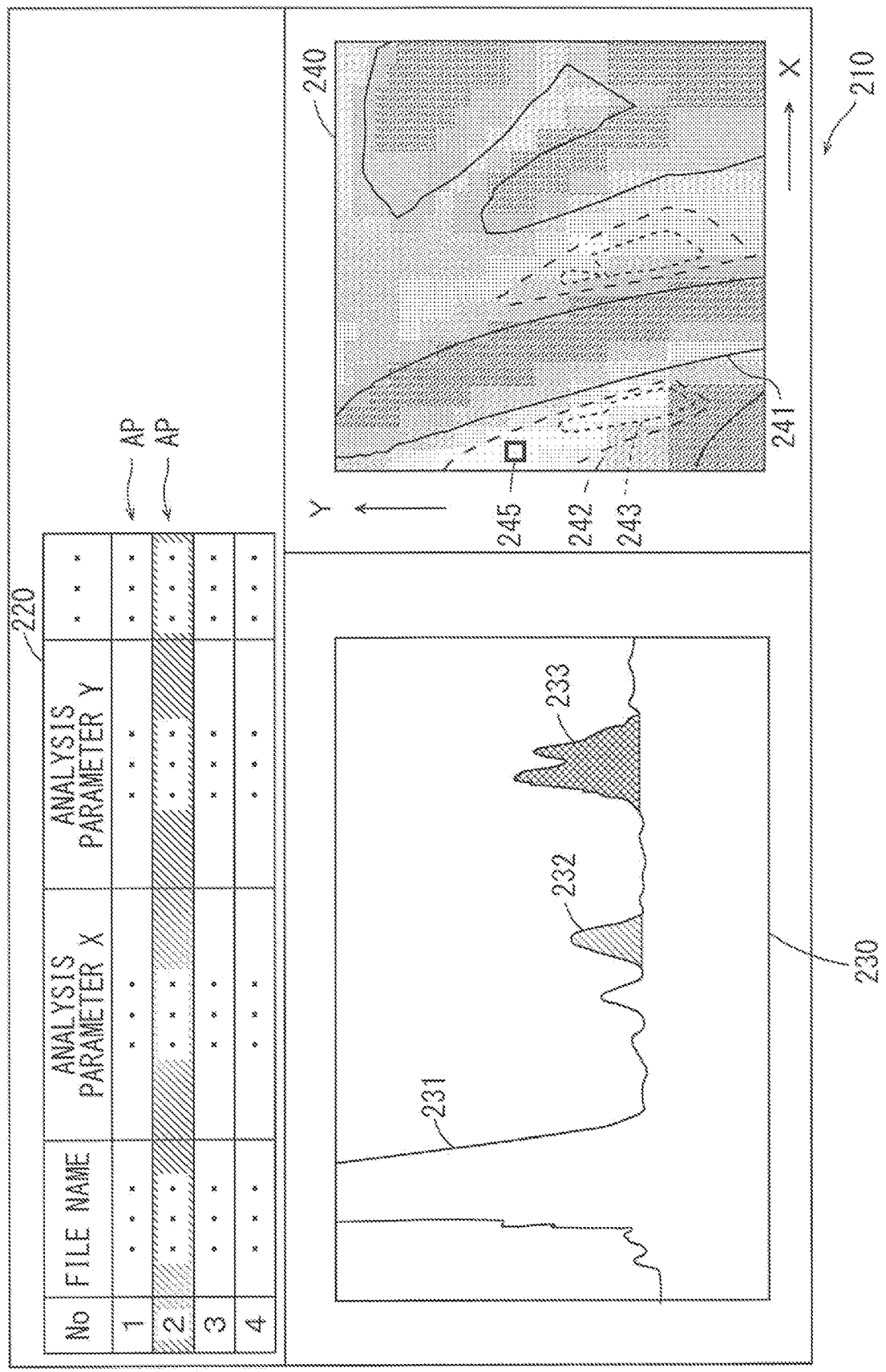
FIG. 10 is a diagram showing an analysis assistance screen displayed in a display.

By the foregoing steps S101 to S109, the analysis assistance program P1 obtains the chromatograms of an analysis result and the distribution of the measurement quality index estimated from the analysis result. FIG. 10 is a diagram showing an analysis assistance screen 210 outputted to the display 104 by the analysis assistance information outputter 204. The analysis assistance screen 210 includes a method list display area 220, a chromatogram display area 230, and a measurement quality index display area 240. The chromatogram display area 230 is outputted by the chromatogram outputter 206. The measurement quality index display area 240 is an area in which the design space is displayed, and is outputted by the measurement quality index outputter 205.

The method list display area 220 displays a list of a plurality of analysis condition data AP. The analysis condition data AP in a row is constituted by a plurality of analysis parameters X, Y . . . .

The chromatogram display area 230 displays a chromatogram generated by the chromatogram generator 207. The chromatogram displayed in the chromatogram display area 230 is a chromatogram corresponding to any one of the plurality of analysis condition data AP displayed in the method list display area 220. In an example shown in FIG. 10, analysis condition data AP of No. 2 is highlighted in the method list display area 220, and a chromatogram corresponding to the analysis condition data AP of No. 2 is displayed in the chromatogram display area 230.

The measurement quality index display area 240 is outputted by the measurement quality index outputter 205 as described above. Distribution of resolution data RD is displayed as a measurement quality index in the measurement quality index display area 240. The abscissa of the distribution represents the analysis parameter X, and the ordinate represents the analysis parameter Y. The distribution of the resolution data RD indicates a relationship between the two analysis parameters X, Y and the resolution data RD.

Also, a solid line 241 in FIG. 10 represents an effective region where the resolution data RD is not less than a threshold value of 2.0 at 50 percentile. A broken line 242 in FIG. 10 represents an effective region where the resolution data RD is not less than the threshold value of 2.0 at 80 percentile. A broken line 243 in FIG. 10 represents an effective region where the resolution data RD is not less than the threshold value of 2.0 at 90 percentile. In the present embodiment, the resolution data RD displayed in the measurement quality index display area 240 is calculated by Bayes estimation and therefore has probability distribution. Thus, a design space is depicted where the resolution data RD is not less than the threshold value of 2.0 for each percentile.

Also, an analysis condition pointer 245 is indicated in the measurement quality index display area 240. This represents a point of currently selected analysis condition data AP. A chromatogram corresponding to the analysis condition data AP designated by the analysis condition pointer 245 is displayed in the chromatogram display area 230. That is, the analysis condition data AP highlighted in the method list display area 220 coincides with the analysis condition data AP designated by the analysis condition pointer 245 in the measurement quality index display area 240. A position selected in the method list display area 220 and a position designated by the analysis condition pointer 245 are in conjunction with each other, and the states of the both positions are changed by performing either the selecting operation or the designating operation.

FIG. 9 is a flowchart indicating a chromatograph display method of the analysis assistance method. First, in step S201, the chromatogram outputter 206 determines whether an operation of designating analysis condition data AP has been accepted. For instance, when the user performs an operation of selecting any of the rows in the method list display area 220, the operation of designating any of the analysis condition data AP is performed. Alternatively, when the user designates any region of the measurement quality index display area 240 by the analysis condition pointer 245, the operation of designating any of the analysis condition data AP is performed.

Then, in step S202, the chromatogram outputter 206 acquires a chromatogram corresponding to the analysis condition data AP designated in step S201.

Then, the chromatogram outputter 206 acquires the area percentage of each peak from the area calculator 208. Also, the chromatogram outputter 206 acquires the separation state of each peak from the determiner 209. Then, in step 203, the chromatogram outputter 206 outputs information to display a peak that is unseparated and has an area percentage of not less than 0.05% in red.

Subsequently, in step S204, the chromatogram outputter 206 outputs information to display a peak that is not unseparated and has an area percentage of not less than 0.05% and less than 0.10% in light blue. Also, the chromatogram outputter 206 outputs information to display a peak that is not unseparated and has an area percentage of not less than 0.10% and less than 0.15% in blue. The chromatogram outputter 206 outputs information to display a peak that is not unseparated and has an area percentage of not less than 0.15% and less than 1.0% in purple. A peak that is not unseparated and has an area percentage of not less than 1.0% is considered as a peak derived from components and is therefore not displayed in an identified manner. A peak that has an area percentage of less than 0.05% can be ignored as impurities and is therefore not displayed in an identified manner.

In FIG. 10, a peak 232 shows an example where the peak is not unseparated and has an area percentage of not less than 0.10% and less than 0.15%, and is therefore displayed in blue. A peak 233 shows an example where the peak is unseparated and has an area percentage of not less than 0.05%, and is therefore displayed in red. A peak 231 has an area percentage of not less than 1.0% and is considered as the peak derived from components, and is therefore not displayed in an identified manner.

In this way, with the analysis assistance device of the present embodiment, the chromatogram generated by the chromatogram generator 207 is displayed in the display 104. At that time, when the area percentage of the peak included in the chromatogram is not less than a predetermined threshold value, and the determiner 209 determines that the peak is unseparated, the peak is displayed in the identified manner. In the above-mentioned example, the peak, which has the area percentage of not less than 0.05% and is unseparated, is displayed in red in the identified manner. Thus, with the analysis assistance device of the present embodiment, it is possible to provide the user with useful information as to the peaks included in the chromatogram. The user can consider setting of new analysis condition data AP by confirming the presence of any unseparated peak.

Also, the analysis assistance device of the present embodiment displays distribution of measurement quality index data in the display 104. Then, in response to the operation of designating any of the analysis condition data AP in the distribution region of the measurement quality index data, the chromatogram outputter 206 outputs a chromatogram correspondingly to a position of the designated analysis condition data AP to the display 103. Thus, the user can grasp a relationship between the distribution of the measurement quality index and the state of the peaks. The user can figure out in which region the unseparation of peaks is generated in the distribution of the measurement quality index.

Figure 11A:
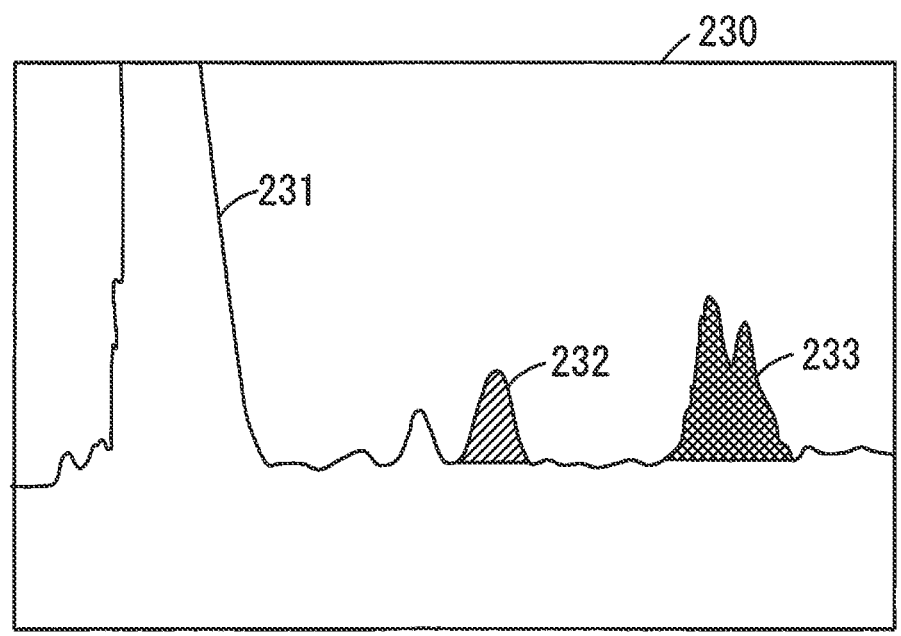
FIGS. 11A and 11B are diagrams showing an analysis assistance screen displayed in the display.
Figure 11B:
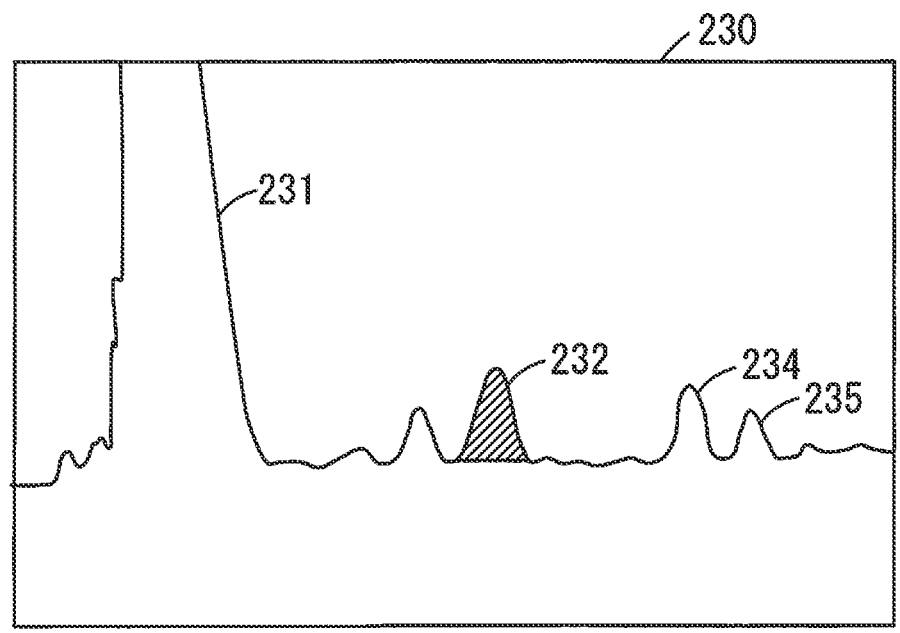

FIGS. 11A and 11B are diagrams showing chromatograms changing with a change in analysis condition data AP. FIG. 11A shows a chromatogram displayed in the display 104 based on certain analysis condition data AP. As shown in FIG. 11A, a peak 233 is unseparated and has an area percentage of not less than 0.05%, and is therefore displayed in red in the identified manner. The user changes the analysis condition data AP in order to separate the peak 233. FIG. 11B shows a chromatogram displayed in the display 104 based on the changed analysis condition data AP. In FIG. 11B, both a peak 234 and a peak 235 have an area percentage of less than 0.05% and are not displayed in the identified manner. It is found that the peak 233 shown in FIG. 11A is separated into the peak 234 and the peak 235 in FIG. 11B. In this way, the user can recognize that the analysis condition data AP is optimized because there is no unseparated peak displayed in red in the identified manner.

Furthermore, the user can analyze the chromatograms by reference also to the peaks displayed in light blue, blue, and purple in the identified manner. The peak displayed in light blue in the identified manner has an area percentage of not less than 0.05%. For example, the user can grasp the peak displayed in light blue in the identified manner as a peak required to be managed. The peak displayed in blue in the identified manner has an area percentage of not less than 0.10%. For example, the user can grasp the peak displayed in blue in the identified manner as a peak required to be specified in structure. The peak displayed in purple in the identified manner has an area percentage of not less than 0.15%. For example, the user can grasp the peak displayed in purple in the identified manner as a peak required to be evaluated in toxicity.

(5) Correspondence Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-described embodiment, the chromatograph 3 is an example of an analysis device. In the above-described embodiment, the computer 1 is an example of an analysis assistance device.

As each of various elements recited in the claims, various other elements having configurations or functions described in the claims can be also used.

(6) Other Embodiments

Figure 12:
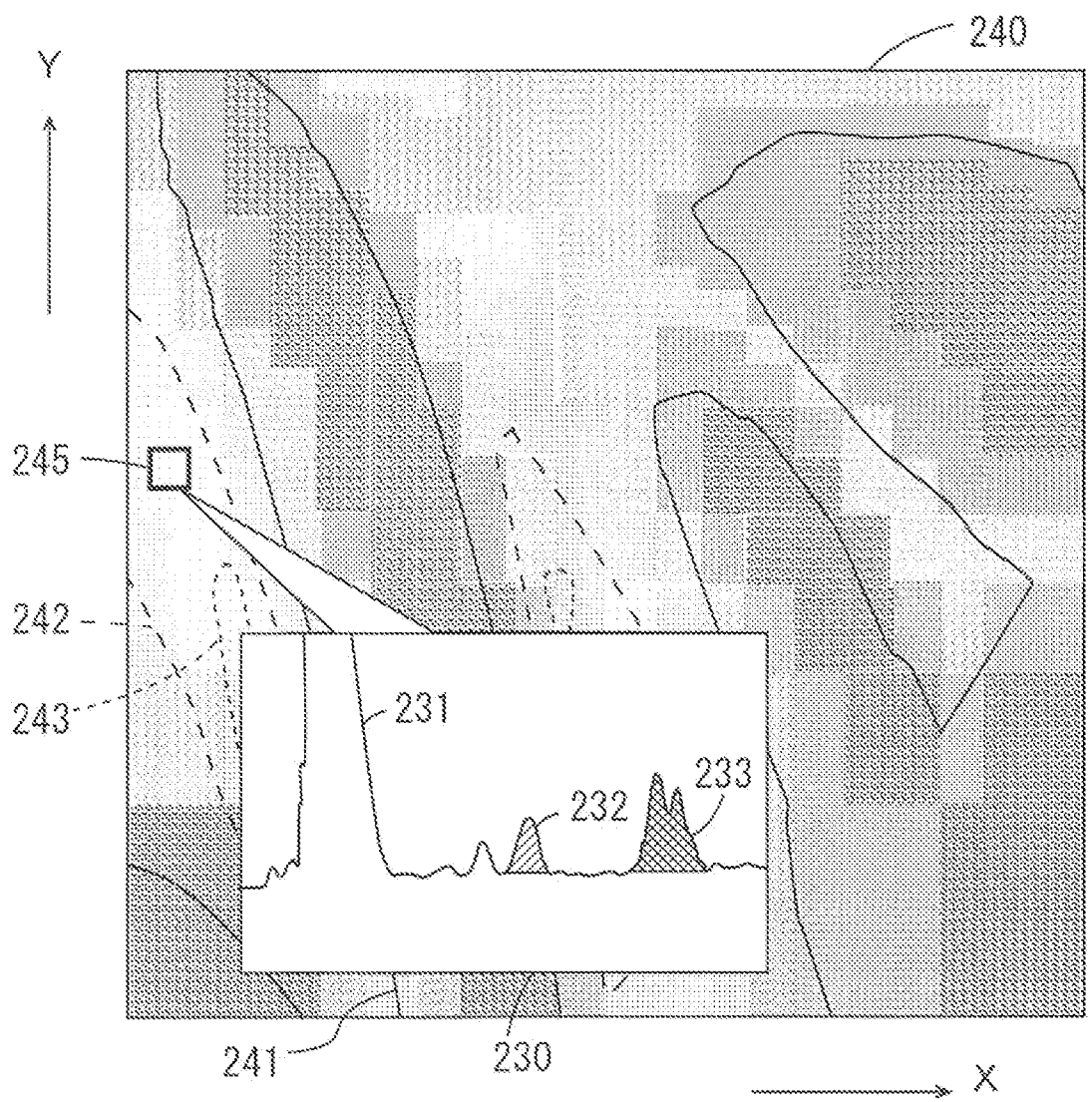
FIG. 12 is a diagram showing an analysis assistance screen displayed in the display.

In the embodiment shown in FIG. 10, the analysis assistance screen 210 includes the chromatogram display area 230 and the measurement quality index display area 240. Therefore, the chromatograms are displayed separately from the distribution of the measurement quality index. FIG. 12 is a diagram showing a chromatogram display method in another embodiment. In the analysis assistance screen 210 shown in FIG. 12, a chromatogram is overlapped with the distribution of the measurement quality index. Moreover, the analysis condition pointer 245 and the chromatogram are linked and depicted. Thus, the user can more clearly grasp a relationship between the analysis condition data AP and the chromatogram.

The chromatograph 3 has been explained as the analysis device of the present invention in the above-described embodiment. The present invention is also applicable to a gas chromatograph. Furthermore, the description has been made on the case where the computer 1 being the analysis assistance device of the present embodiment is connected to the liquid chromatograph 3 being the analysis device via the network 4 as an example in the above-described embodiment. As another embodiment, a configuration in which the computer 1 is incorporated in the analysis device may be applied.

In the above-described embodiment, the description has been made on the case where the analysis assistance program P1 is stored in the storage device 106 as an example. As another embodiment, the analysis assistance program P1 may be provided to be stored in the storage medium 109. The CPU 101 may access the storage medium 109 via the device interface 108 so that the analysis assistance program P1 stored in the storage medium 109 be stored in the storage device 106 or the ROM 103. Alternatively, the CPU 101 may access the storage medium 109 via the device interface 108 to execute the analysis assistance program P1 stored in the storage medium 109.

The specific configuration of the present invention is not limited to the above-described embodiments. Various variations and modifications are available without departing from the scope of the present invention.

(7) Aspects

The above-mentioned plurality of exemplary embodiments are understood as specific examples of the below-mentioned aspects by those skilled in the art.

(Item 1)

An analysis assistance device according to one aspect of the present invention includes:
- a chromatogram generator that generates a chromatogram using measurement data obtained from an analysis device;
- an area calculator that calculates an area percentage of each peak included in the chromatogram;
- a determiner that determines a separation state of each peak included in the chromatogram; and
- an analysis assistance information outputter that outputs analysis assistance information to a display, and
- the analysis assistance information outputter includes a chromatogram outputter that outputs the chromatogram generated by the chromatogram generator to the display and also outputs information to display one peak in an identified manner when the one peak has an area percentage of not less than a predetermined threshold value, and the determiner determines that the one peak is an unseparated peak.

Thus, with the analysis assistance device of the present embodiment, a user can be provided with useful information as to the peaks included in the chromatogram. The user can consider setting of new analysis condition data by confirming the presence of the unseparated peak.

(Item 2)

In the analysis assistance device according to the item 1, the analysis assistance device may further include an estimator that estimates distribution of measurement quality index data using a plurality of analysis condition data to be provided to an analysis device and a plurality of measurement data obtained in the analysis device based on the plurality of analysis condition data, the analysis assistance information outputter may include a measurement quality index outputter that outputs the distribution of the measurement quality index data, and the chromatogram outputter may output, in response to an operation of designating one analysis condition data, the chromatogram correspondingly to a position of the one analysis condition data in a distribution region of the measurement quality index data outputted by the measurement quality index outputter.

Thus, the user can grasp a relationship between the distribution of the measurement quality index and the state of the peaks. The user can gasp in which region unseparation of the peaks is generated in the distribution of the measurement quality index.

(Item 3)

In the analysis assistance device according to the item 2, the chromatogram outputter may output the chromatogram in an overlapped manner in the distribution region of the measurement quality index data.

Thus, the user can more clearly grasp a relationship between the analysis condition data and the chromatogram.

(Item 4)

In the analysis assistance device according to any one of the items 1 to 3, the chromatogram outputter may output information to display a peak determined to be not unseparated by the determiner in a different manner corresponding to an area percentage of the peak.

Thus, the user can clearly grasp a magnitude of the peak based on the area percentage of the peak.

(Item 5)

An analysis assistance method according to another aspect of the present invention includes:
generating a chromatogram using measurement data obtained from an analysis device;
calculating an area percentage of each peak included in the chromatogram;
determining a separation state of each peak included in the chromatogram; and
displaying the generated chromatogram in a display, and also displaying one peak in an identified manner when an area percentage of the one peak is not less than a predetermined threshold value, and the one peak is determined to be an unseparated peak in the determining.

(Item 6)

A non-transitory computer readable medium storing an analysis assistance program according to another aspect of the present invention causes a computer to execute:

processing of generating a chromatogram using measurement data obtained from an analysis device;
processing of calculating an area percentage of each peak included in the chromatogram;
processing of determining a separation state of each peak included in the chromatogram; and
processing of displaying the generated chromatogram in a display, and also displaying one peak in an identified manner when an area percentage of the one peak is not less than a predetermined threshold value, and the one peak is determined to be an unseparated peak in the processing of determining.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. An analyzing apparatus comprising:
an analysis device which analyzes a sample containing a first substance, a second substance, and a third substance under a certain analysis condition;
a processor configured to:
generate a chromatogram using data obtained from the analysis device;
calculate an area percentage of a first peak in a case where the first peak, a second peak, and a third peak are included in the generated chromatogram, wherein:
the area percentage of the first peak is a ratio of an area of the first peak to a sum of areas of the first to third peaks; and
the first peak, the second peak, and the third peak correspond to the first substance, the second substance, and the third substance, respectively;
determine a first resolution of the first peak and the second peak from a first retention time of the first peak and a second retention time of the second peak, and a first peak width of the first peak and a second peak width of the second peak; and
determine a second resolution of the first peak and the third peak from the first retention time and the third retention time of the third peak, and the first peak width and a third peak width of the third peak; and
a display that displays the chromatogram, such that:
when the first resolution is not more than a predetermined resolution threshold and the second resolution is more than the predetermined resolution threshold and when the area percentage of the first peak is not less than a predetermined area percentage threshold, the first and second peaks are both illustrated in a first displaying manner and the third peak is illustrated in a second displaying manner which is different from the first displaying manner.

2. The analyzing apparatus according to claim 1, wherein the processor is further configured to:
estimate distribution of measurement quality index data using a plurality of analysis condition data to be provided to the analysis device and a plurality of measurement data obtained in the analysis device based on the plurality of analysis condition data,
output the distribution of the measurement quality index data, and
in response to an operation of designating one analysis condition data, output the chromatogram correspondingly to a position of the one analysis condition data in a distribution region of the output measurement quality index data.

3. The analysis assistance device according to claim 2, wherein the chromatogram is output in an overlapped manner in the distribution region of the measurement quality index data.

4. The analysis assistance device according to claim 1, wherein the display displays separated peak of the chromatogram in a different manner corresponding to an area percentage of the separated peak.

5. An analysis assistance method comprising:
analyzing with an analysis device a sample containing a first substance, a second substance, and a third substance under a certain analysis condition;
generating with a processor a chromatogram using data obtained from the analysis device;
calculating with the processor an area percentage of a first peak in a case where the first peak, a second peak, and a third peak are included in the generated chromatogram, wherein:
the area percentage of the first peak is a ratio of an area of the first peak to a sum of areas of the first to third peaks; and
the first peak, the second peak, and the third peak correspond to the first substance, the second substance, and the third substance, respectively;
determining with the processor a first resolution of the first peak and the second peak from a first retention time of the first peak and a second retention time of the second peak, and a first peak width of the first peak and a second peak width of the second peak;
determining with the processor a second resolution of the first peak and the third peak from the first retention time and the third retention time of the third peak, and the first peak width and a third peak width of the third peak; and
displaying with a display the chromatogram, such that:
when the first resolution is not more than a predetermined resolution threshold and the second resolution is more than the predetermined resolution threshold and when the area percentage of the first peak is not less than a predetermined a area percentage threshold, the first peak and the second peak are both illustrated in a first displaying manner and the third peak is illustrated in a second displaying manner which is different from the first displaying manner.

6. A non-transitory computer readable medium storing an analysis assistance program causing a computer to execute:
processing of generating a chromatogram using data obtained from an analysis device, wherein the analysis device analyzes a sample containing a first substance, a second substance, and a third substance under a certain analysis condition;
processing of calculating an area percentage of a first peak in a case where the first peak, a second peak, and a third peak are included in the generated chromatogram, wherein:
the area percentage of the first peak is a ratio of an area of the first peak to a sum of areas of the first to third peaks; and
the first peak, the second peak, and the third peak correspond to the first substance, the second substance, and the third substance, respectively; and
processing of determining a first resolution of the first peak and the second peak from a first retention time of the first peak and a second retention time of the second peak, and a first peak width of the first peak and a second peak width of the second peak;
processing of determining a second resolution of the first peak and the third peak from the first retention time and the third retention time of the third peak, and the first peak width and a third peak width of the third peak; and
processing of displaying on the display the chromatogram, such that:
when the first resolution is not more than a predetermined resolution threshold and the second resolution is more than the predetermined resolution threshold and when the area percentage of the first peak is not less than a predetermined area percentage threshold, the first and second peaks are both illustrated in a first displaying manner and the third peak is illustrated in a second displaying manner which is different from the first displaying manner.

* * * * *